United States Patent
Breuer et al.

(10) Patent No.: US 6,368,422 B1
(45) Date of Patent: Apr. 9, 2002

(54) PROCESS FOR REMOVING SOLID ASPHALT RESIDUES PRODUCED IN THE PETROLEUM INDUSTRY

(75) Inventors: Wolfgang Breuer, Korschenbroich; Claus-Peter Herold, Mettmann, both of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/380,699

(22) PCT Filed: Feb. 21, 1998

(86) PCT No.: PCT/EP98/01010

§ 371 Date: Nov. 26, 1999

§ 102(e) Date: Nov. 26, 1999

(87) PCT Pub. No.: WO98/39549

PCT Pub. Date: Sep. 11, 1998

(51) Int. Cl.[7] ................................................. C23G 5/00
(52) U.S. Cl. .................. 134/40; 134/22.1; 134/22.11; 134/22.14; 134/22.19; 510/188; 166/304; 166/311
(58) Field of Search ............................ 134/22.1, 22.11, 134/22.14, 22.19, 36, 40; 166/311, 304; 507/116, 218; 510/188

(56) References Cited

U.S. PATENT DOCUMENTS

| | | | | |
|---|---|---|---|---|
| 4,180,472 A | * | 12/1979 | Mitchell et al. | 252/162 |
| 4,276,094 A | * | 6/1981 | Gutnick et al. | 134/10 |
| 4,356,096 A | * | 10/1982 | Cowan et al. | 252/8.5 |
| 4,821,757 A | * | 4/1989 | Hayes et al. | 137/13 |
| 5,194,173 A | * | 3/1993 | Folkard et al. | 252/170 |
| 5,204,026 A | * | 4/1993 | Doscher-Good | 252/542 |
| 5,326,407 A | * | 7/1994 | Baviere et al. | 134/25.1 |
| 5,634,984 A | * | 6/1997 | Van Slyke | 134/40 |
| 5,670,460 A | * | 9/1997 | Neely et al. | 507/203 |
| 5,693,600 A | * | 12/1997 | Hendriksen et al. | 510/170 |
| 5,780,407 A | * | 7/1998 | Van Slyke | 510/188 |
| 5,788,781 A | * | 8/1998 | Van Slyke | 134/40 |
| 6,173,776 B1 | * | 1/2001 | Furman et al. | 166/279 |

FOREIGN PATENT DOCUMENTS

EP           0498545 A1  *  8/1992  ............ B41N/3/06

* cited by examiner

*Primary Examiner*—Randy Gulakowski
*Assistant Examiner*—Jiri Smetana
(74) *Attorney, Agent, or Firm*—John E. Drach; Henry E. Millson, Jr.

(57) ABSTRACT

Methods and compositions for dissolving adherent petroleum residues which occur in the production and processing of petroleum in which esters of the following formula are employed:

$$R^1-COO-(C_nH_{2n}O)_x-R^2 \qquad (I)$$

which $R^1$ is an alkyl group containing 6 to 22 carbon atoms or a $(CH_2)_m-COOR^4$ group, $R^2$ and $R^4$ independently of one another represent an alkyl group containing 1 to 8 carbon atoms, n is the number 2 or 3 and m is a number of 1 to 6 and x is 0 or a number of 1 to 12.

24 Claims, No Drawings

PROCESS FOR REMOVING SOLID ASPHALT RESIDUES PRODUCED IN THE PETROLEUM INDUSTRY

FIELD OF THE INVENTION

This invention relates to a process and compositions for removing solid asphaltene residues from the surface of production equipment or the formation surrounding the well in the production and processing of petroleum and to the use of certain fatty acid esters for this purpose.

BACKGROUND OF THE INVENTION

Crude oil is a complex mixture of various paraffinic and aromatic hydrocarbons, the individual constituents having very different chemical and physical properties. Accordingly, both readily volatile low-viscosity constituents and wax-like high-viscosity fractions are obtained in the distillation of crude oil. The wax-like fractions include petroleum resins and, for the most part, asphaltenes which are colloidally dispersed in the oil phase.

Asphaltenes consist of a mixture of various saturated, unsaturated and aromatic hydrocarbons, more especially naphthalene derivatives. They also contain heterocyclic hydrocarbons which partly contain complexed metal ions also. Asphaltenes are also rich in sulfur, nitrogen and oxygen compounds. In view of their complex composition, asphaltenes are generally characterized by their solubility. Thus, the petroleum fraction insoluble in heptane or pentane but soluble in toluene is referred to by the name of asphaltenes, the "dissolution" of the asphaltenes representing a complex process of which there has hitherto been no complete theoretical description (cf. E. Y. Sheu, O. C. Mullins, *Asphaltenes— Fundamentals and Applications,* Plenum Press, New York, 1995, Chapter I and Chapter III).

Asphaltenes are present in the oil phase of crude oil as micellar colloids, the individual micelles consisting of several different molecules. The micelles differ in size according to the temperature and composition of the oil phase. For example, it is known that lighter aromatic hydrocarbons in crude oil stabilize the asphaltene micelles. Under the conditions under which petroleum is produced, however, the asphaltenes are often precipitated which results in the formation of highly viscous, wax-like to solid residues on the surface of the production equipment and the oil-containing formation surrounding the well. The asphaltene residues block the pores of the formation which results in a considerable reduction in the production rates and, in the worst case, can even make production completely impossible. Asphaltene residues on the surfaces of production equipment, for example the delivery tube or the casing walls of pipelines or separators, can also seriously affect production.

Accordingly, there are various known methods for removing asphaltene residues occurring in the production of petroleum. For example, the residues can be removed mechanically or by treatment with hot mineral oil or with aqueous surfactant solutions. In general, however, efforts are made to remove the residues with suitable organic solvents, more especially benzene, toluene or xylene. However, since some of these compounds do not have adequate dissolving properties, a search was made for alternatives. According to the teaching of U.S. Pat. No. 5,504,063, for example, the dissolving properties of the above-mentioned aromatic hydrocarbons can be improved by addition of up to 50% by volume of certain N-substituted imidazolines or condensation products of polyamines with fatty acids. By contrast, U.S. Pat. No. 5,382,728 proposes a special mixture of saturated, aromatic and polyaromatic hydrocarbons as suitable solvents for asphaltene residues.

However, these solvents or solvent mixtures cannot be used in every case in view of their low flash points, their high volatility and their high cost. In addition, because working materials are having to meet more stringent environmental compatibility requirements and with industrial safety in mind, efforts are being made to avoid the use of ecologically unsafe and carcinogenic substances.

DESCRIPTION OF THE INVENTION

Accordingly, the problem addressed by the present invention was to find ecologically safe alternatives to the solvents known from the prior art for the solid asphaltene residues which occur in the production and processing of petroleum.

Although it was already known that asphaltenes can be precipitated with polar liquids, such as alcohols or esters (H.-J. Neuman, I. Rahimian, G. Zenke, *Analytik der Asphaltene, Erdöl und Kohle—Erdgas— Petrochemie,* Vol. 39, No. 2, 1986), it has surprisingly been found that certain fatty acid esters are suitable as solvents for asphaltene residues.

In a first embodiment, therefore, the present invention relates to the use of fatty acid esters corresponding to general formula (I):

$$R^1\text{—COO—}(C_nH_{2n}O)_x\text{—}R^2 \qquad (I)$$

In which $R^1$ is an alkyl group containing 6 to 22 carbon atoms or a $(CH_2)_m$—$COOR^4$ group, $R^2$ and $R^4$ independently of one another representing an alkyl group containing 1 to 8 carbon atoms, n is the number 2 or 3 and m is a number of 1 to 6 and x is 0 or a number of 1 to 12, for removing solid asphaltene residues from the surfaces of production equipment or the petroleum-containing formation surrounding the well in the production and processing of petroleum.

Asphaltenes in the context of the present invention are understood to be those constituents of crude oil which, according to DIN 51595 (December 1983), precipitate when the petroleum is dissolved in 30 times the volume of heptane at 18 to 28° C. and which are soluble in benzene. Solid asphaltene residues are residues which have a solid or wax-like consistency at the particular working temperature to which the surface is exposed and of which more than 50% by weight consist of asphaltenes. Besides asphaltenes, the solid residues may also contain petroleum resins or other solids.

The solid asphaltene residues can form on the surface of production equipment in the production of petroleum, production equipment in the context of the invention being understood to include any equipment which comes into direct contact with the oil. Such equipment includes, for example, the production tube, the casing of the well and all other oil-carrying lines, pipelines, separators, pumps and valves. Except for the casing, the surface of such production equipment normally consists of metal, more especially steel, the casing generally consisting of concrete. However, production equipment in the context of the invention also includes the crude oil processing steps which follow the actual production cycle, for example the distillation of the crude oil fractions. Asphaltene residues can also occur in the transportation of crude oil through pipelines or during storage thereof and can thus affect production.

However, solid asphaltene residues are also formed on the surface of the petroleum-containing formation surrounding the well where they block the pores of the rock which leads to a considerable reduction in the production rate.

The fatty acid esters which are used in accordance with the invention to remove the solid asphaltene residues may be synthesized by any methods known to the expert. To this end, alcohol and fatty acid are normally reacted in the presence of acidic or basic catalysts, optionally under pressure. Another method of obtaining fatty acid esters corresponding to general formula (I) is the transesterification of natural fats and oils with methanol in the presence of a catalyst. Suitable natural oils are, for example, rapeseed oil, sunflower oil, soybean oil, linseed oil or coconut oil.

Suitable alcohols which may be used in the synthesis of the esters used in accordance with the invention are either unbranched, such as methanol, ethanol, propanol, butanol, pentanol, hexanol, or branched, such as isopropanol, isobutanol, 2-methyl or 2-ethyl hexanol.

Suitable saturated fatty acids are caproic acid, caprylic acid, lauric acid, myristic acid, palmitic acid, stearic acid, arachic acid or behenic acid. Unsaturated fatty acids are, for example, lauroleic acid, palmitoleic acid, oleic acid, ricinoleic acid, linoleic acid and linolenic acid. Besides the monocarboxylic acids, esters of dicarboxylic acids, such as maleic, succinic or adipic acid, may also be used for the synthesis.

Also suitable are technical mixtures of esters corresponding to formula (I) which may be obtained, for example, by esterifying the head-fraction fatty acids obtained in the purification of fatty acid mixtures by distillation. Mixtures of esters corresponding to formula (I) may also be used.

It has proved to be of particular advantage and, accordingly, is preferable to use esters of general formula (I) in which $R^1$ is an alkyl group containing 6 to 10 carbon atoms, $R^2$ is a methyl group and x is 0. Mixtures of these esters which are obtained by esterifying head-fraction fatty acids containing 6 to 10 carbon atoms with methanol are preferably used.

Besides the fatty acid esters described above, fatty acid ester alkoxylates corresponding to general formula (I), in which n is the number 2 or 3 and x is a number of 1 to 12, may also be used in accordance with the present invention. Compounds such as these are obtained by reacting fatty acid derivatives with alkoxylated methanol or by the heterogeneously catalyzed direct alkoxylation of fatty acid alkyl esters with alkylene oxide, more especially ethylene oxide. This synthesis process is described in detail in WO 90/13533 and WO 91/15441. Fatty acid alkyl ester alkoxylates of general formula (I), where $R^1$ is an alkyl group containing 8 to 16 carbon atoms, $R^2$ is a short-chain alkyl group containing 1 to 4 carbon atoms, preferably a methyl group, n is 2 and x is a number of 2 to 6, are preferably used.

If asphaltene deposits are formed on the surface of production equipment or the formation surrounding the well during the production of petroleum, which is normally reflected in a reduction in the production rate, the affected part of the production equipment or the well is contacted with the fatty acid esters. To this end, the esters are preferably pumped through the production equipment or the well in liquid form at temperatures of at least 50° C. in order to remove the deposits. Accordingly, the present invention also relates to a process for removing solid asphaltene residues from the surface or production equipment or the petroleum-containing formation surrounding the well in the production and processing of petroleum, characterized in that the asphaltene residues are contacted with an ester corresponding to formula (I) in liquid form and at a temperature of at least 50° C. until the residues have at least partly dissolved. In the production of petroleum, this is reflected, for example, in the fact that the production rate rises again. The time taken to remove the asphaltene deposits will depend upon their quantity and also upon the working temperature. For example, asphaltene deposits dissolve more quickly under the conditions prevailing at the surface of the petroleum-containing formation, namely high pressure and high temperatures (150 to 300° C.), than for example deposits which occur in the production tube because lower temperatures (<100° C.) prevail there. As explained above, dissolving of the residue involves a complex process in which the asphaltenes are colloidally dissolved in the form of micelles.

The production equipment can be flushed with liquid ester alone, although this is by no means preferred for reasons of cost. In addition, depending on the temperature at which the ester is used and its melting point, viscosity problems can arise during storage of the pure ester. At low temperatures, for example in winter, heated tanks would have to be used for relatively high-melting compounds. Because of this, the esters are preferably used in the form of a mixture with a suitable solvent in order to avoid the handling problems mentioned. It has proved to be of particular advantage to use the esters in admixture with crude oil or petroleum—the fraction distilling over at 180 to 225° C. in the distillation of crude oil. In principle, mixtures with a ratio by weight of crude oil or petroleum to ester of 1:99 to 99:1 may be used. However, mixtures with certain percentage contents of esters are preferably used for the purposes of the invention.

Accordingly, the present invention also relates to a liquid composition containing crude oil or petroleum for removing solid asphaltene residues from the surface of production equipment or the petroleum-containing formation surrounding the well in the production and processing of petroleum, characterized in that it contains more than 25% by weight of at least one fatty acid ester corresponding to general formula (I). Compositions containing crude oil or petroleum in which more than 50% by weight of esters corresponding to formula (I) are present are particularly preferred. The esters are dissolved or dispersed in the crude oil or petroleum and may thus be stored and used without difficulty. Besides crude oil or petroleum and the esters corresponding to formula (I), the compositions may also contain other ingredients, for example corrosion inhibitors or other known solvents for asphaltenes and precipitation-preventing asphaltene inhibitors, such as imidoamides, imidazolines or aromatic sulfonic acids as described in U.S. Pat. No. 5,504,063.

The present invention also relates to a process for removing solid asphaltene residues from the surface of production equipment or the petroleum-containing formation surrounding the well in the production and processing of petroleum, characterized in that the asphaltene deposits are contacted with a liquid composition containing crude oil or petroleum which has a temperature of at least 50° C. and which contains at least 25% by weight of an ester corresponding to formula (I) until the residues have at least partly dissolved.

EXAMPLES

A certain quantity of an asphaltene deposit (residue from the Laque refinery in France) was stirred for 1.5 hours at 50 to 10° C. in a glass beaker with a weighed quantity of a fatty acid ester A–D. The liquids were then filtered and the remaining asphaltene residue was afterwashed with heptane. Solubility was determined by comparing the quantity of asphaltenes weighed in with the quantity of filtered asphaltene residue. The results are set out in Table 1. To detect the asphaltenes in the filtrate, 30 times the volume of heptane was added to the filtrate in accordance with DIN 51595 (December 1983). The asphaltenes were precipitated as specified.

Ester
A rapeseed oil fatty acid methyl ester
B $C_{6-10}$ head-fraction fatty acid methyl ester
C $C_{12}$ fatty acid methyl ester ethoxylated with 6 moles of ethylene oxide per mole of ester
D $C_{8-14}$ fatty acid-2-ethylhexyl ester

TABLE 1

| Ester | Quantity of asphaltene [g] | Quantity of ester [g] | Temperature [° C.] | Quantity of asphaltene reweighed [g] | Solubility [g asphaltene/ 100 g ester] |
|---|---|---|---|---|---|
| A | 5.1 | 69.2 | 55 | 1.9 | 4.6 |
| B | 8.1 | 55.0 | 105 | 3.7 | 8.0 |
| C | 5.3 | 44.9 | 110 | 4.5 | 1.5 |
| D | 4.1 | 60.5 | 105 | 2.4 | 2.8 |

What is claimed is:

1. A method for dissolving at least a portion of adherent solid or viscous residues resulting from the production or processing of petroleum comprising contacting said residues with at least one fatty acid ester of the formula $$R^1-COO-(C_nH_{2n}O)_x-R^2 \qquad (I)$$

in which $R^1$ is an alkyl group containing 6 to 22 carbon atoms or a $(CH_2)_m-COOR^4$ group, $R^2$ and $R^4$ independently of one another represent an alkyl group containing 1 to 8 carbon atoms, n is the number 2 or 3 and m is a number of 1 to 6 and x is 0 or a number of 1 to 12 at a temperature of at least about 50° C. until the residues are a least partly dissolved.

2. The method of claim 1 wherein said residues comprise asphaltene residues.

3. The method of claim 1 wherein in the at least one ester of formula I, $R^1$ is an alkyl group containing 6 to 10 carbon atoms, $R^2$ is a methyl group and x is 0.

4. The method of claim 1 wherein the residues are on the surface of production or transportation equipment or on the petroleum-containing formation surrounding the production well.

5. The method of claim 1 wherein the at least one ester is present in a solvent in an amount of more than about 25% by weight thereof.

6. The method of claim 5 wherein said amount is more than about 50% by weight.

7. The method of claim 1 wherein said temperature is from about 150° to about 300° C.

8. The method of claim 5 wherein the solvent is crude oil or a fraction thereof distilling at a temperature of from about 180° to about 225° C.

9. The method of claim 1 wherein in the at least one ester of formula I, n=2 or 3 and x is a number of from 1 to 12.

10. The method of claim 1 wherein in the at least one ester of formula I, $R^1$ is an alkyl group containing from 8 to 16 carbon atoms, $R^2$ is an alkyl group containing from 1 to 4 carbon atoms, n=2, and x is a number of from 2 to 6.

11. A method for removing solid asphaltene residues from the surfaces of production or transportation equipment or from petroleum-containing formations surrounding the production well in the production and processing of petroleum comprising contacting the asphaltene residues with at least one fatty acid ester of the formula $$R^1-COO-(C_nH_{2n}O)_x-R^2 \qquad (I)$$

in which $R^1$ is an alkyl group containing 6 to 22 carbon atoms or a $(CH_2)_m-COOR^4$ group, $R^2$ and $R^4$ independently of one another represent an alkyl group containing 1 to 8 carbon atoms, n is the number 2 or 3 and m is a number of 1 to 6 and x is 0 or a number of 1 to 12 at a temperature of from about 150° to 300° C. until the residues are at least partially dissolved.

12. The method of claim 11 wherein in the at least one ester of formula I, $R^1$ is an alkyl group containing 6 to 10 carbon atoms, $R^2$ is a methyl group and x is 0.

13. The method of claim 11 wherein in the at least one ester of formula I, n=2 or 3 and x is a number of from 1 to 12.

14. The method of claim 11 wherein in the at least one ester of formula I, $R^1$ is an alkyl group containing from 8 to 16 carbon atoms, $R^2$ is an alkyl group containing from 1 to 4 carbon atoms, n=2, and x is a number of from 2 to 6.

15. A composition for removing adherent petroleum residues which occurs in the production and processing of petroleum comprising
A) crude oil or a fraction thereof distilling at a temperature of from about 180° to about 225° C.; and
B) more than 25% by weight of at least one fatty acid ester of the formula $$R^1-COO-(C_nH_{2n}O)_x-R^2 \qquad (I)$$

in which $R^1$ is an alkyl group containing 6 to 22 carbon atoms or a $(CH_2)_m-COOR^4$ group, $R^2$ and $R^4$ independently of one another represent an alkyl group containing 1 to 8 carbon atoms, n is the number 2 or 3 and m is a number of 1 to 6 and x is 0 or a number of 1 to 12.

16. The composition of claim 15 wherein in the at least one ester of formula I, $R^1$ is an alkyl group containing 6 to 10 carbon atoms, $R^2$ is a methyl group and x is 0.

17. The composition of claim 15 wherein in component B) said amount is more than about 50% by weight.

18. The composition of claim 15 wherein in the at least one ester of formula I, x is a number of from 1 to 12.

19. The composition of claim 15 wherein in the at least one ester of formula I, $R^1$ is an alkyl group containing from 8 to 16 carbon atoms, $R^2$ is an alkyl group containing from 1 to 4 carbon atoms, n=2, and x is a number of from 2 to 6.

20. A method for removing solid asphaltene residues from the surfaces of production or transportation equipment of from petroleum-containing formations surrounding the production well in the production and processing of petroleum comprising contacting the asphaltene residues with at least one fatty acid ester of the formula $$R^1-COO-(C_nH_{2n}O)_x-R^2 \qquad (I)$$

in which $R^1$ is an alkyl group containing 6 to 22 carbon atoms or a $(CH_2)_m-COOR^4$ group, $R^2$ and $R^4$ independently of one another represent an alkyl group containing 1 to 8 carbon atoms, n is the number 2 or 3 and m is a number of 1 to 6 and x is 0 or a number of 1 to 12 at a temperature of at least about 50° C. until the residues are at least partially dissolved, wherein the at least one ester is present in a solvent in an amount of more than about 25% by weight thereof, and wherein the solvent is crude oil or a fraction thereof distilling at a temperature of from about 180° to about 225° C.

21. The method of claim 20 wherein in the at least one ester of formula I, $R^1$ is an alkyl group Containing 6 to 10 carbon atoms, $R^2$ is a methyl group and x is 0.

22. The method of claim 20 wherein in the at least one ester of formula I, n=2 or 3 and x is a number of from 1 to 12.

23. The method of claim 20 wherein in the at least one ester of formula I, $R^1$ is an alkyl group containing from 8 to 16 carbon atoms, $R^2$ is an alkyl group containing from 1 to 4 carbon atoms, n=2, and x is a number of from 2 to 6.

24. The method of claim 20 wherein said amount is more than about 50% by weight.

* * * * *